(12) United States Patent
Trinh et al.

(10) Patent No.: US 10,910,007 B1
(45) Date of Patent: Feb. 2, 2021

(54) HEAT-ASSISTED MAGNETIC RECORDING DEVICE CAPABLE OF PROVIDING NEGATIVE ELECTRICAL POTENTIAL AT NFT

(71) Applicant: Western Digital Technologies, Inc., San Jose, CA (US)

(72) Inventors: Tan Trinh, San Jose, CA (US); Sukumar Rajauria, San Jose, CA (US); Yuichi Aoki, Chiyoda-ku (JP); Kosuke Nagase, Kawasaki (JP); Erhard Schreck, San Jose, CA (US); Qing Dai, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 16/791,238

(22) Filed: Feb. 14, 2020

(51) Int. Cl.
| | | |
|---|---|---|
| G11B 11/105 | (2006.01) | |
| G11B 5/60 | (2006.01) | |
| G11B 5/31 | (2006.01) | |
| G11B 5/245 | (2006.01) | |

(Continued)

(52) U.S. Cl.
CPC .............. *G11B 5/607* (2013.01); *G11B 5/245* (2013.01); *G11B 5/3133* (2013.01); *G11B 5/6076* (2013.01); *G11B 7/126* (2013.01); *G11B 2005/0018* (2013.01); *G11B 2005/0021* (2013.01)

(58) Field of Classification Search
USPC .... 369/13.01–13.55, 112.09, 112.14, 112.21, 369/112.27, 300; 360/59, 66, 360/123.02–125.75, 131; 385/11–14, 31, 385/88–94, 123–132, 141–145; 29/603.07–603.27

See application file for complete search history.

(56) References Cited

U.S. PATENT DOCUMENTS

| | | |
|---|---|---|
| 7,321,476 B2 | 1/2008 | Baumgart et al. |
| 8,049,984 B2 | 11/2011 | Contreras et al. |
| 8,125,727 B2 | 2/2012 | Tsuwako et al. |

(Continued)

OTHER PUBLICATIONS

Murthy et al., "In-Situ Contact Potential Measurement in Hard Disk Drives Using Head Disk Interface Voltage Control", ASME 2014 Conference on Information Storage and Processing Systems 2014 Conference on Information Storage and Processing Systems Santa Clara, California, USA, Jun. 23-24, 2014 Conference Sponsors: Information Storage and Processing Systems Division.

(Continued)

*Primary Examiner* — Tan X Dinh
(74) *Attorney, Agent, or Firm* — Patterson & Sheridan, LLP; Steven H. Versteeg (57) ABSTRACT

A heat-assisted magnetic recording (HAMR) hard disk drive has a gas-bearing slider supporting a near-field transducer (NFT) and a NFT temperature sensor (NTS). An optional first IVC circuitry may provide a bias voltage to the slider body to assure substantially zero electrical potential between the slider body and the disk to minimize slider-disk contact and lubrication pick-up. A second IVC circuitry operates independently of the first IVC circuitry and provides a negative bias voltage to the NTS (and the connected NFT) relative to the disk to minimize the adverse effects of excessive heating on the NFT.

14 Claims, 5 Drawing Sheets

(51) Int. Cl.
*G11B 5/00* (2006.01)
*G11B 7/126* (2012.01)

(56) References Cited

U.S. PATENT DOCUMENTS

| | | | |
|---|---|---|---|
| 8,139,309 B2 | 3/2012 | Knigge et al. | |
| 8,570,684 B1 | 10/2013 | Contreras et al. | |
| 8,760,779 B2 | 6/2014 | Johns et al. | |
| 9,001,444 B1 | 4/2015 | Contreras et al. | |
| 9,042,208 B1* | 5/2015 | Knigge | G11B 5/607 |
| | | | 369/13.33 |
| 9,202,484 B1 | 12/2015 | Watanabe et al. | |
| 9,401,169 B1* | 7/2016 | Canchi | G11B 5/6076 |
| 9,437,222 B1 | 9/2016 | Okamura et al. | |
| 9,595,280 B2 | 3/2017 | Canchi et al. | |
| 9,653,121 B1* | 5/2017 | Chu | G11B 5/455 |
| 9,978,412 B1 | 5/2018 | Macken et al. | |
| 10,424,323 B1* | 9/2019 | Contreras | G11B 5/314 |
| 10,650,850 B1* | 5/2020 | Rajauria | G11B 5/4826 |
| 2011/0090586 A1 | 4/2011 | Tsuwako et al. | |
| 2013/0286806 A1* | 10/2013 | Wessel | G11B 5/3136 |
| | | | 369/13.33 |
| 2014/0240871 A1 | 8/2014 | Canchi et al. | |
| 2014/0269819 A1 | 9/2014 | Kiely et al. | |
| 2015/0085630 A1 | 3/2015 | Macken et al. | |
| 2015/0318003 A1* | 11/2015 | Cheng | G11B 5/314 |
| | | | 216/24 |
| 2016/0163343 A1* | 6/2016 | Olson | G11B 33/14 |
| | | | 360/234.5 |
| 2017/0370770 A1* | 12/2017 | Kiely | G01J 1/4257 |
| 2019/0066725 A1* | 2/2019 | Rajauria | G11B 13/08 |

OTHER PUBLICATIONS

International Search Report and Written Opinion issued in corresponding International Patent Application No. PCT/US2020/036329, dated Sep. 16, 2020 (11 pages).

\* cited by examiner

HEAT-ASSISTED MAGNETIC RECORDING DEVICE CAPABLE OF PROVIDING NEGATIVE ELECTRICAL POTENTIAL AT NFT

BACKGROUND

Field of the Invention

Embodiments of the invention relate generally to a heat-assisted magnetic recording (HAMR) disk drive.

Description of the Related Art

Magnetic recording HDDs use a read/write transducer or head mounted on a head carrier for reading and/or writing data to a recording layer on the disk. The head carrier is typically a gas-bearing slider attached to an actuator arm by a suspension and positioned very close to the disk surface by the suspension. There is typically a stack of disks in the HDD with a slider-suspension assembly associated with each disk surface in the stack.

The separation or spacing between the slider and the disk surface is called the fly height. The slider has a disk-facing gas-bearing surface (GBS) that causes the slider to ride on a cushion or bearing of gas, typically air or helium, generated by rotation of the disk. The slider is attached to a flexure on the suspension and the suspension includes a load beam that applies a load force to the slider to counteract the gas-bearing force while permitting the slider to "pitch" and "roll". The flying dynamics of the slider and thus the fly height are influenced by factors such as the rotation speed of the disk, the aerodynamic shape of the slider's GBS, the load force applied to the slider by the suspension, and the pitch and roll torques applied to the slider by the suspension.

HDDs may use thermal fly-height control (TFC) of the read/write heads. One type of TFC uses an electrically resistive heater located on the slider near the head. When current is applied to the heater, the heater expands and causes the head to expand and thus move closer to the disk surface. The head can be adjusted to different heights, depending on whether the drive is reading or writing. Also, the heater can maintain the head at the optimal fly-height even in the presence of the above-described factors, which would otherwise cause changes in the fly-height. The TFC heater must be accurately calibrated so that the head-disk spacing can be controlled, which typically requires urging the head toward the disk until contact is made ("touchdown") at which point the slider is urged away from the disk ("pull-back"). An embedded contact sensor (ECS), embedded in the slider near the read/write head, can be used to sense touchdown. The ECS comprises a metallic strip located at the slider GBS. The resistance of the ECS changes in response to temperature changes so the voltage across the ECS can be used to determine touchdown, when the slider temperature changes as it comes in close proximity to the disk.

As the areal data density of the disks increases, the magnetic grains that make up the data bits can be so small that they can be demagnetized simply from thermal instability or agitation within the magnetized bit (the so-called "superparamagnetic" effect). One proposed solution to the thermal stability problem is heat-assisted magnetic recording (HAMR), wherein the magnetic recording material is heated locally during writing by the write head to lower the coercivity enough for writing to occur, but where the coercivity/anisotropy is high enough for thermal stability of the recorded bits at the ambient temperature of the disk drive (i.e., the normal operating temperature range of approximately 15-60° C.). In some proposed HAMR systems, the magnetic recording material is heated to near or above its Curie temperature. The recorded data is then read back at ambient temperature by the read head.

The most common type of proposed HAMR disk drive uses a laser source and an optical waveguide with a near-field transducer (NFT). A "near-field" transducer refers to "near-field optics", wherein the passage of light is through an element with sub-wavelength features and the light is coupled to a second element, such as a substrate like a magnetic recording medium, located a sub-wavelength distance from the first element. The NFT is typically located at the GBS. A NFT temperature sensor (NTS) may be located near the NFT for monitoring its temperature.

In conventional non-HAMR disk drives IVC (Interface Voltage Control) is used to apply a voltage to the slider body, or to the disk. In some instances, IVC may be used to passivate the slider by encapsulating at least a portion of the slider body with a static electrical charge, which can help preserve the life of the slider and corresponding read/write head by protecting it from mechanical wear as well as from chemical oxidation. Further, in some instances IVC may be used to minimize the slider-disk potential differences. When the slider-disk potential is not cancelled completely, an attractive electrostatic force pulls the slider close to the disk, which may cause head-disk contact and/or lubrication pick-up by the slider from the disk.

SUMMARY

In embodiments of this invention it has been discovered that the lifetime of the NFT is adversely affected by excessive heating of the NFT. Excessive heating of the NFT can cause diffusion of the NFT metal until the NFT tip rounds and recording degrades.

In embodiments of this invention it has been discovered that the lifetime of the NFT can be improved if a negative bias voltage is applied to the NFT relative to the disk. Embodiments of this invention include interface voltage control (IVC) to apply a negative bias voltage between the NFT and the disk. The HAMR disk drive may optionally include dual independent interface voltage control (IVC) circuitry so that a first bias voltage ($V_{IVC1}$) can be applied to the slider body to protect the read/write head from mechanical and chemical oxidation and a second bias voltage ($V_{IVC2}$) different from $V_{IVC1}$ can be applied to the NTS (and the electrically connected NFT) to assure a negative bias voltage between the NFT and the disk.

For a complete understanding of the nature and advantages of the invention, reference should be made to the following detailed description taken together with the accompanying figures.

DETAILED DESCRIPTION

Figure 1:
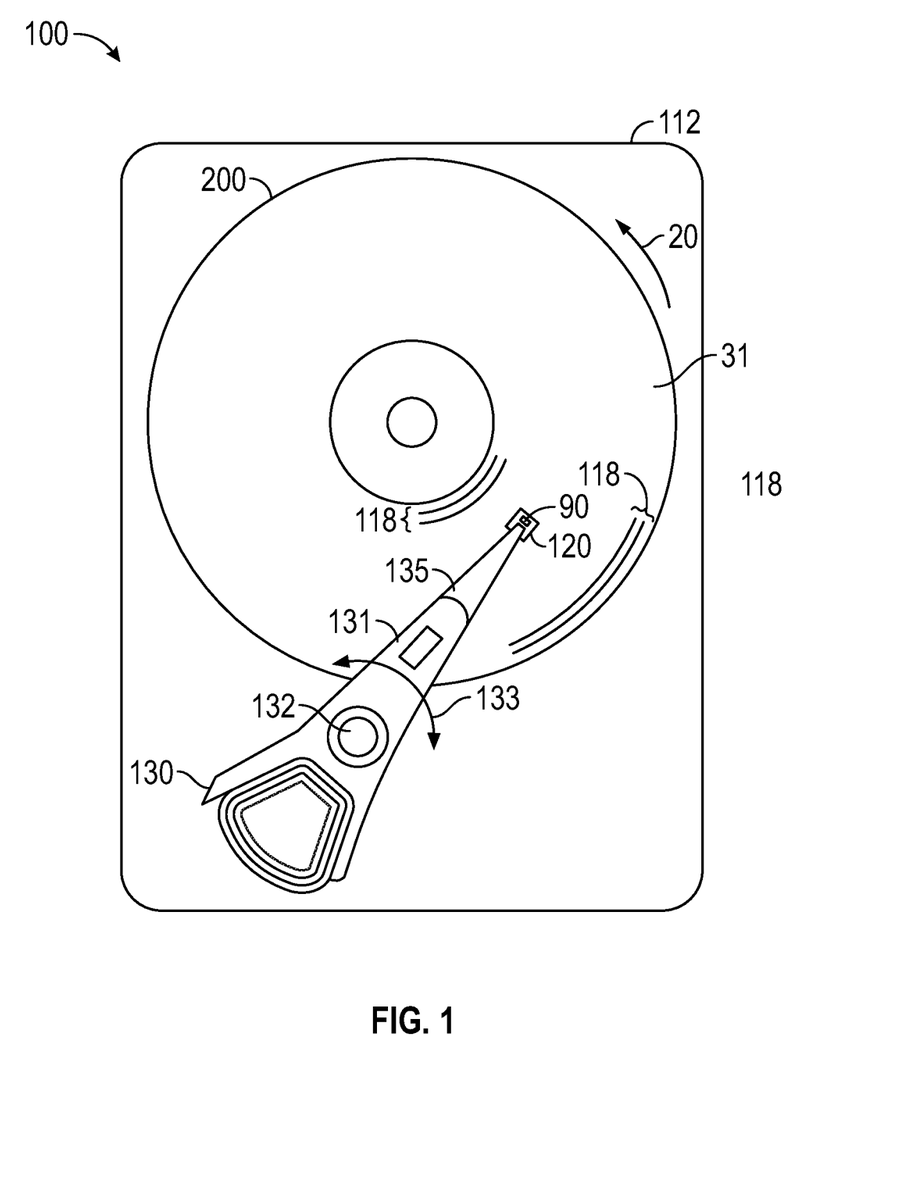
FIG. 1 is a top view of a heat-assisted magnetic recording (HAMR) disk drive according to embodiments of the invention.

A plan view illustrating a HAMR HDD 100 according to embodiments of the invention is shown in FIG. 1 to illustrate an exemplary operating environment.

In FIG. 1, the HAMR HDD 100 is depicted with a disk 200 with a continuous magnetic recording layer 31 with concentric circular data tracks 118. Only a portion of a few representative tracks 118 near the inner and outer diameters of disk 200 are shown.

The drive 100 has a housing or base 112 that supports an actuator 130 and a drive motor for rotating the magnetic recording disk 200. The actuator 130 may be a voice coil motor (VCM) rotary actuator that has a rigid arm 131 and rotates about pivot 132 as shown by arrow 133. A head-suspension assembly includes a suspension 135 that has one end attached to the end of actuator arm 131 and a head carrier, such as a gas-bearing slider 120, attached to the other end of suspension 135. The suspension 135 permits the slider 120 to be maintained very close to the surface of disk 200 and enables it to "pitch" and "roll" on the gas-bearing (typically air or helium) generated by the disk 200 as it rotates in the direction of arrow 20. The slider 120 supports the HAMR head (not shown), which includes a magnetoresistive read head, an inductive write head, the near-field transducer (NFT) and optical waveguide. A semiconductor laser 90, for example with a wavelength of 780 to 980 nm, may be used as the HAMR light source and is depicted as being supported on the top of slider 120. Alternatively, the laser may be located on suspension 135 and coupled to slider 120 by an optical channel. As the disk 200 rotates in the direction of arrow 20, the movement of actuator 130 allows the HAMR head on the slider 120 to access different data tracks 118 on disk 200. The slider 120 is typically formed of a composite material, such as a composite of alumina/titanium-carbide ($Al_2O_3$/TiC). Only one disk surface with associated slider and read/write head is shown in FIG. 1, but there are typically multiple disks stacked on a hub that is rotated by a spindle motor, with a separate slider and HAMR head associated with each surface of each disk.

The disk drive 100 includes electronic architecture that comprises numerous electronic components for performing their respective functions for operation of the drive, such as a hard disk controller ("HDC"), an interface controller, a read/write integrated circuit (R/W IC), an arm electronics (AE) module, a motor driver, a servo processor, and other digital processors and associated memory. Two or more of such components may be combined on a single integrated circuit board referred to as a "system on a chip" ("SOC"). Several, if not all, of such electronic components are typically arranged on a printed circuit board that is coupled to the bottom side of the drive, such as to housing 112.

Figure 2:
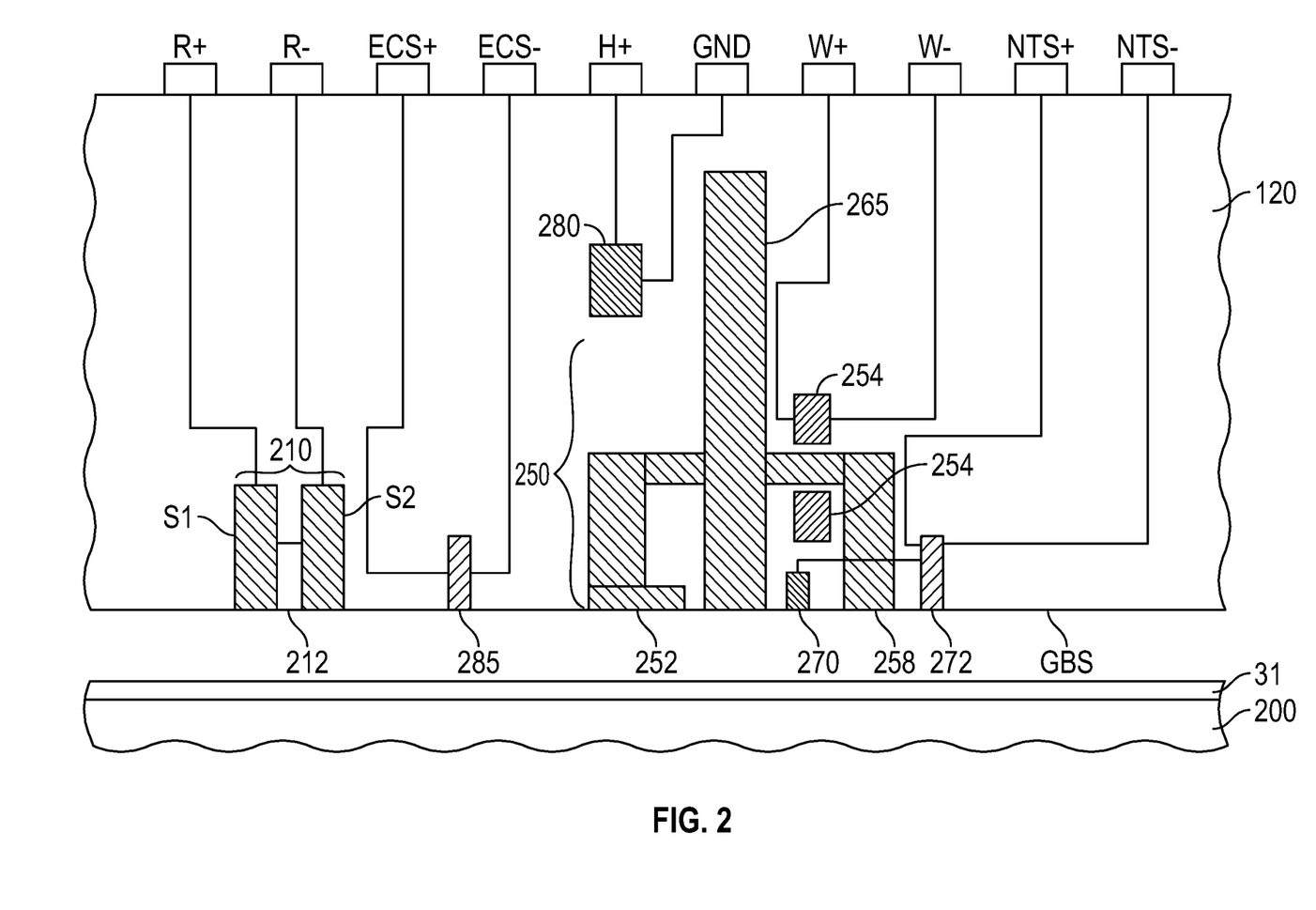
FIG. 2 is a cross-sectional view of the disk and the slider of the HAMR disk drive and shows a reader, a writer, a heater, an embedded contact sensor (ECS), a near-field transducer (NFT) and a NFT temperature sensor (NTS).

FIG. 2 is a cross-sectional view of the disk 200 (with recording layer 31) and the slider 120 and shows a reader, a writer, an optional heater, an optional embedded contact sensor (ECS), a waveguide, a near-field transducer (NFT) and a NFT temperature sensor (NTS). Reader 210 comprises a read sensor 212, typically a magnetoresistive sensor, located between two soft magnetic shields S1 and S2, and is connected to contact pads R+, R− on the top of the slider.

Writer 250 comprises a main pole (MP) 252, a return pole 258 and a write coil 254. MP 252 is exposed at the gas-bearing surface (GBS) of the slider 120 and faces disk 200. Electric current flowing through the coil 254 produces a magnetic field that emits from the tip of MP 252 and forms recording bits by reversing the magnetization of magnetic regions on the recording layer 31 of disk 200. The coil 254 is connected to write head contact pads W+, W− on the top of the slider. The return pole 258 is positioned for providing means for the magnetic flux to return from recording layer 31 to the writer structure to complete the magnetic circuit.

The laser 90 (FIG. 1) is optically coupled to waveguide 265. The waveguide 265 is formed inside the slider 120 and guides light from the laser to the NFT 270. The NFT 270, also known as a plasmonic antenna, typically uses a low-loss metal (e.g., Au, Ag, Al or Cu) shaped in such a way to concentrate surface charge motion at a tip located at the slider GB S when light from the waveguide 265 is incident. Oscillating tip charge creates an intense near-field pattern, heating the recording layer 31 on disk 200. Sometimes, the metal structure of the NFT 270 can create resonant charge motion (surface plasmons) to further increase intensity and heating of the recording layer. At the moment of recording, the recording layer 31 of disk 200 is heated by the optical near-field generated by the NFT 270 at the same time a region or "bit" is magnetized by applying a recording magnetic field generated by the MP 252. The NFT 270 is located near and connected to a temperature sensor (NTS) 272, which is typically a resistor in a circuit that monitors the temperature of the NFT 270. For example, a metal or other electrically conductive layer is located between the NFT 270 and the NTS 272. As the temperature of the NFT 270 changes, the resistance of the resistor changes. The NTS 272 can be used to calibrate the NFT 270. Electrical connection is made to NTS 272 from contact pads NTS+, NTS− on the top of the slider.

The disk drive may optionally include a heater 280 controlled by a thermal fly-height control (TFC) device (not shown), which is connected to heater 280 at pads H+, G on the top of the slider. By applying current to the heater 280, the surrounding slider material is caused to expand in response to the heat, which causes a bulge in the slider toward the disk 200, thus reducing the flying height.

If the disk drive includes a heater, then it typically also includes an embedded contact sensor (ECS) 285, such as a metallic strip located at the GBS and connected to contact pads ECS+, ECS− on the top of the slider. The resistance of the ECS 285 changes in response to temperature changes and can be used to detect slider-disk contact, when the slider temperature suddenly increases due to frictional heating with the disk 200. The ECS is also typically used during calibration of the TFC device. During write operations, the heater 280 causes the MP 252 and NFT 270 to be closer to the disk 200 to thereby enable the written magnetic bits to be placed closer together.

It has been discovered that the lifetime of the NFT is adversely affected by excessive heating of the NFT. Excessive heating of the NFT can cause diffusion of the NFT metal until the NFT tip rounds and recording degrades.

Figure 3:
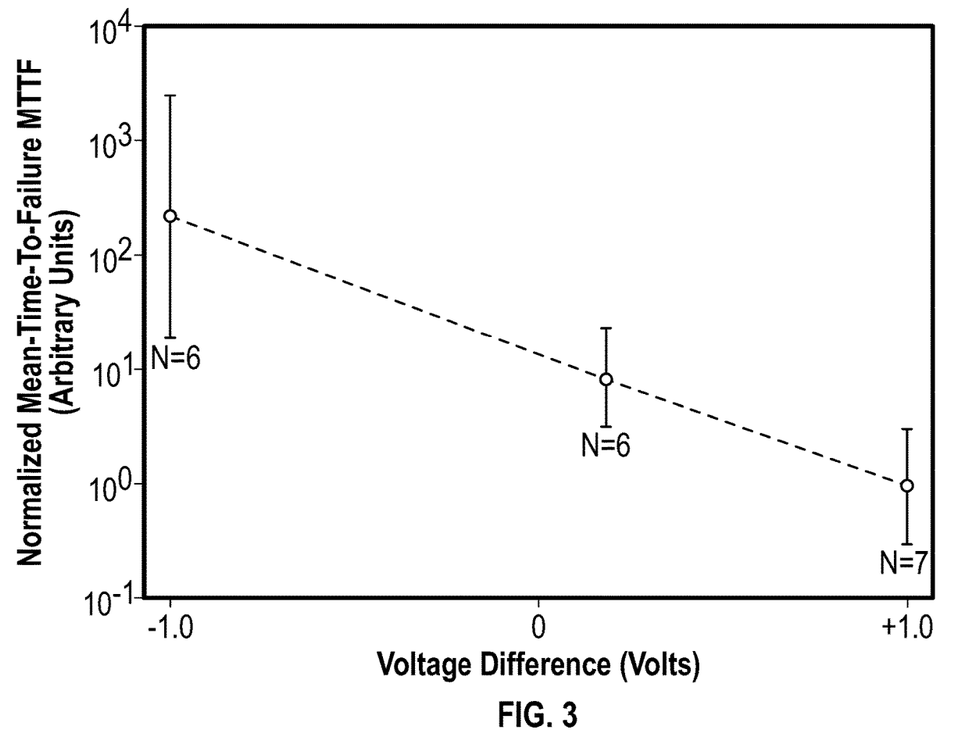
FIG. 3 is a graph of NFT lifetime as a function of voltage difference between the NFT and the disk.

In embodiments of this invention it has been discovered that the lifetime of the NFT can be improved if a negative bias voltage is applied to the NFT relative to the disk. Embodiments of this invention include interface voltage control (IVC) to apply a negative bias voltage between the NFT and the disk. The IVC applies a negative voltage to the NTS, which is electrically connected to the NFT. FIG. 3 is a graph of NFT lifetime as a function of the voltage difference between the NFT and the disk. Each data point was generated by measuring the time to failure of the NFT, i.e., the time it takes for the NFT to degrade to the point where the write head cannot write data on the disk of the same quality as prior to the testing. NFT lifetime is improved as the interface voltage becomes more negative. For the N samples tested, the lifetime shows dramatic improvement of NFT lifetime if the voltage difference is negative versus positive.

It is known that in some instances, IVC may be used in conventional non-HAMR disk drives to passivate the slider by encapsulating at least a portion of the slider body with a static electrical charge, which can help preserve the life of the slider and corresponding read/write head by protecting it from mechanical wear as well as from chemical oxidation. Further, in some instances IVC may be used to minimize the slider-disk potential differences. When the slider-disk potential is not cancelled completely, an attractive electrostatic force pulls the slider close to the disk, which may cause head-disk contact and/or lubrication pick-up by the slider from the disk.

Figure 4:
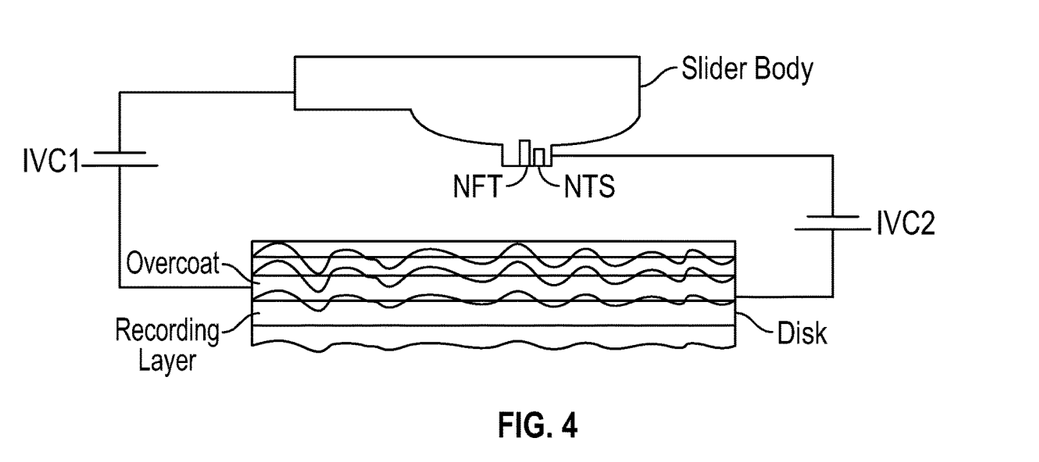
FIG. 4 is a diagram illustrating dual independent interface voltage control (IVC) circuitry to provide different bias voltages to the slider body and the NTS.

Thus in embodiments of this invention, the HAMR disk drive may optionally include dual independent interface voltage control (IVC) circuitry so that a first bias voltage can be applied to the slider body that is different from a second bias voltage applied to the NTS. This is illustrated graphically in FIG. 4. First IVC circuitry (IVC1) assures substantially 0V between the slider body and the disk while second IVC circuitry (IVC2) provides a bias voltage to assure a negative voltage between the NTS (and the electrically connected NFT) and the disk.

Figure 5:
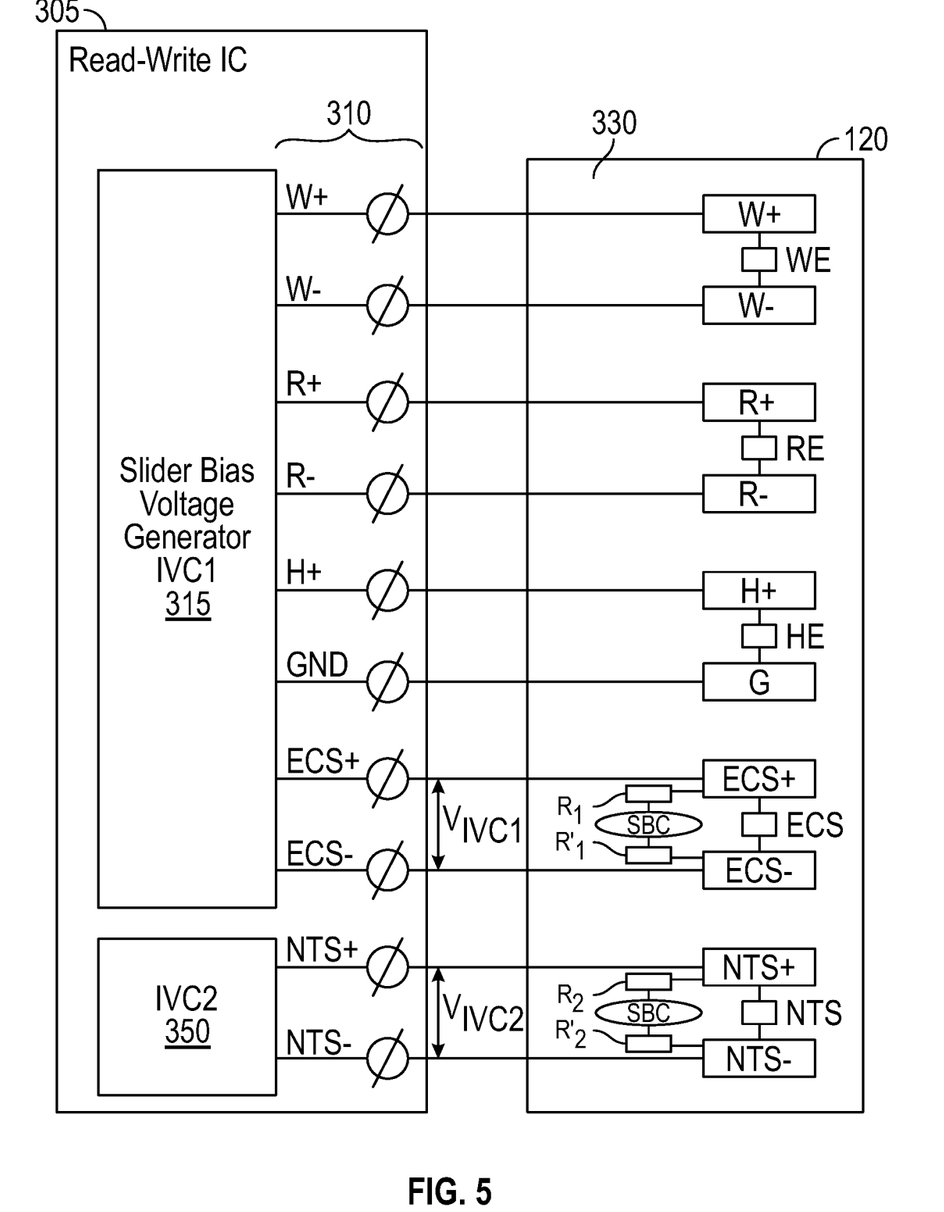
FIG. 5 is block diagram of a slider coupled to dual independent interface voltage control (IVC) systems in a read/write integrated circuit (R/W IC) according to an embodiment of the invention.

FIG. 5 is block diagram of a slider coupled to dual independent interface voltage control (IVC) systems according to an embodiment of the invention. A slider bias voltage generator 315 functions as first interface voltage control circuitry (IVC1) and generates a direct current (DC) bias voltage to an element on the body 330 of slider 120 via an existing signal path, which in FIG. 5 is the signal path to the ECS. Slider bias voltage generator 315 is shown as a portion of read-write integrated circuit (R/W IC) 305. In some embodiments, slider bias voltage generator 315 is located in other portions of HDD 100 (FIG. 1). For example, in other embodiments, slider bias voltage generator 315 may be included as a portion of a printed circuit board attached to HDD base 112 or included in the AE module. By "existing signal path," what is meant is that a conventional existing signal path, such as a read path, write path, heater element control path or ECS path is utilized for coupling the bias voltage generator 315 to slider body 120. While an existing signal path may be slightly modified, such as through the inclusion of components such as a capacitor, a coupling to a slider body connection, and/or a resistor, a separate special purpose signal path for coupling the slider bias voltage from slider bias voltage generator 315 to slider body 120 is not required. The existing signal path is primarily used for conveying another signal (e.g., a read data signal, write data signal, heater element control signal, or ECS signal) between the slider and electronics external to the slider. However, at least sometimes the other signal and a slider bias voltage are conveyed simultaneously, integrated together with one another, on the same signal path within the slider. Thus, this existing signal path may convey the bias voltage to conductive body 120 in an "integral fashion" along with the other signal that is being conveyed to or from the slider on the same signal path. In certain embodiments of this invention IVC1 may convey the slider bias voltage via any of the existing signal paths. In other embodiments, a non-existing (i.e., a dedicated) signal path may be used.

In FIG. 5, slider 120 comprises a conductive body 330 and includes a write element (WE), read element (RE), heater element (HE), embedded contact sensor (ECS) and NTS. A signal path exists between R/W IC 305 and each of the elements. R/W IC 305 includes a plurality of R/W IC input/outputs (I/Os) 310. The I/Os 310 may comprise pads for electrical connection via existing signal paths to corresponding pads on the top of slider 120, as shown by pads on the top of the slider in FIG. 2. R/W IC input/outputs 310 include: write+(W+) and write−(W−), read+(R+) and read−(R−), heater element control+(H+) and ground (G), ECS+ and ECS−, and NTS+ and NTS−.

In the example of FIG. 5 wherein IVC1 is coupled to the ECS, slider 120 includes resistive components R1 and R1' which are coupled between a slider body connection (SBC), and each leg of the signal path between the ECS and R/W IC 305. This provides a common mode signal path, which couples the slider bias voltage $V_{SB}$ to slider body 120. With this connection scheme, the ECS common-mode voltage $V_{ECS-CM}$ is equivalent to $(V_{ECS-}+V_{ECS+})/2$ and can be used to control the potential of slider body 120 relative to the disk.

While FIG. 5 illustrates an embodiment where the existing signal path is the ECS signal path, the existing signal path can comprise any of the write signal path, the read signal path, the heater element control signal path or the ECS path. While the existing signal path is primarily used for conveying another signal (e.g., a write signal, read signal, heater element control signal, ECS signal) to or from (and through) slider 120, at least sometimes the existing signal path conveys the bias voltage to the conductive body in an integral fashion along with another signal (such as the signal which the existing signal path primarily carries). In some embodiments, the existing signal and/or the bias voltage is applied through a common mode voltage on a pair of signal lines. The IVC1 utilizes a predetermined programmable bias voltage value $V_{IVC1}$ (typically between about −1.0V and +1.0V) to control the bias voltage generation. The predetermined programmable bias voltage value is selected from a set voltage ranges (values) known to avoid slider-lube pickup or by other methods that accounts for disk voltage and lube variations. In one embodiment, once the bias voltage value is determined and/or selected, well-known circuit methods are utilized to transfer a digital setting to an analog voltage reference, which is then used for generation of the bias voltage. The range of values can be preselected, such as at a factory or laboratory. In one embodiment, the predetermined programmable bias voltage value itself is set or selected in a factory, laboratory, or while a disk drive is in operation. U.S. Pat. No. 8,125,727 B2 and US 2014/0240871 A1, both assigned to the same assignee as this application, describe techniques for determining the bias voltage value to be applied to the slider body. In the preferred method according to an embodiment of the invention, the ICV1 bias voltage $V_{IVC1}$ is selected to assure there is substantially no electrical potential (0V) between the slider body and the disk, since it has been discovered that this value results in minimum slider-disk contact and lubrication pick-up.

The above-described slider bias voltage generator 315 that functions as the IVC1 in embodiments of this invention is described in detail in U.S. Pat. No. 8,049,984 B2, which is assigned to the same assignee as this invention and is incorporated herein by reference.

FIG. 5 also illustrates a second interface voltage control circuitry (IVC2) 350 coupled to the NTS, and thus to the NFT, via an existing signal path. The IVC2 350 provides a bias voltage $V_{IVC2}$ to the NTS to assure a negative potential between the NFT and the disk and is separate from and independent of IVC1. Like slider bias voltage generator 315 (IVC1), IVC2 may be located as part of R/W IC 305, on a printed circuit board or as part of the AE module.

Figure 6:
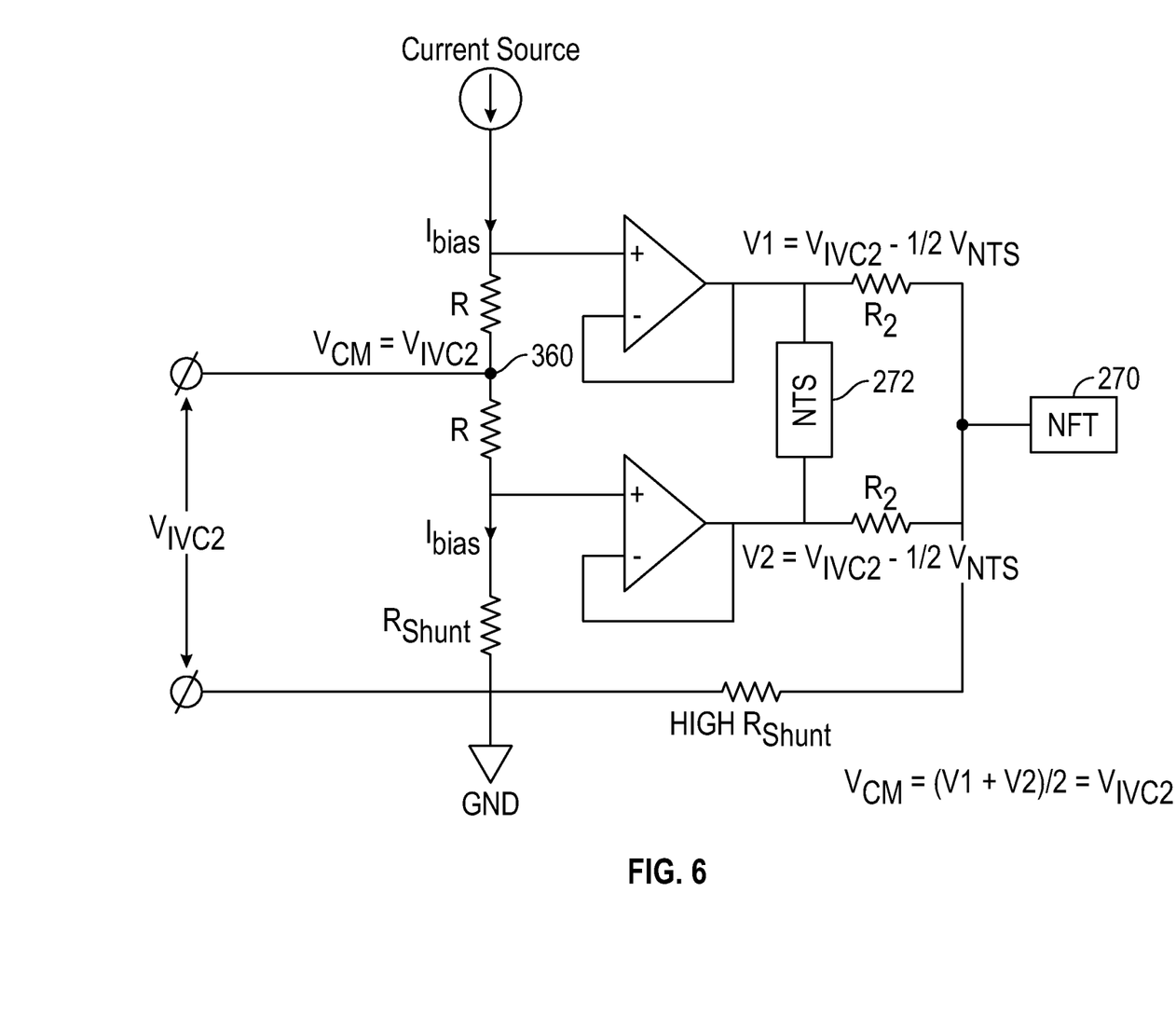
FIG. 6 is a schematic illustrating an embodiment of the operation of the second interface voltage control circuitry (IVC2) connected to the NTS.

FIG. 6 is a schematic illustrating an embodiment of the operation of IVC2 connected to the NTS. The NTS 272 (FIG. 2) is not part of the circuit but is connected to the NFT 270, for example, by a layer of conductive material. A programmable current source generates a current $I_{bias}$. The voltage $V_{IVC2}$ is a common mode voltage $W_{CM}$ applied between resistors R, which have substantially equal resistances. As shown by the equations on FIG. 6, the voltage at one end of the NTS relative to ground (i.e., the disk) is given by $V1=+V_{NTS}/2+V_{IVC2}$ and the voltage at the other end of the NTS relative to ground is given by $V2=-V_{NTS}/2+V_{IVC2}$. Thus in one example for illustrating how IVC2 assures the desired negative potential at the NFT relative to the disk, assume the NTS voltage $V_{NTS}$ is 100 mV. If $V_{IVC2}$ is set at −500 mV, then this results in V1 being −450 mV and V2 being −550 mV.

Like IVC1, the IVC2 may utilize a predetermined programmable bias voltage value $V_{IVC2}$ to control the bias voltage generation. The predetermined programmable bias voltage value is selected from a set voltage ranges (values) known to assure negative electrical potential at the NTS. In one embodiment, once the bias voltage value is determined and/or selected, well-known circuit methods are utilized to transfer a digital setting to an analog voltage reference, which is then used for generation of the bias voltage. The range of values can be preselected, such as at a factory or laboratory. In one embodiment, the predetermined programmable bias voltage value itself is set or selected in a factory, laboratory, or while a disk drive is in operation, typically based on a calibration technique that involves measuring the slider flying height at different common mode voltages.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A heat-assisted magnetic recording (HAMR) disk drive comprising:
    a rotatable magnetic recording disk;
    a gas-bearing slider maintained over the surface of the disk when the disk is rotating;
    a write head on the slider comprising a main pole;
    an optical waveguide on the slider for receipt of laser radiation;
    a near-field transducer (NFT) on the slider for optical coupling with the waveguide;
    a NFT temperature sensor (NTS) coupled to the NFT;
    interface voltage control circuitry coupled to the NFT, the interface voltage control circuitry being adapted to provide a negative electrical potential at the NFT relative to the disk and adapted to apply a common mode voltage to the NTS, wherein the interface voltage control circuitry comprises a source for generating a reference current through a pair of resistors having substantially equal resistance values, and wherein the interface voltage control circuitry is further adapted to apply said common mode voltage between the two resistors of said pair.

2. A heat-assisted magnetic recording (HAMR) disk drive comprising:
    a rotatable magnetic recording disk;
    a gas-bearing slider maintained over the surface of the disk when the disk is rotating;
    a write head on the slider comprising a main pole;
    an optical waveguide on the slider for receipt of laser radiation;
    a near-field transducer (NFT) on the slider for optical coupling with the waveguide; and
    interface voltage control circuitry coupled to the NFT, the interface voltage control circuitry being adapted to provide a negative electrical potential at the NFT relative to the disk, wherein the interface voltage control circuitry coupled to the NFT is a second interface voltage control circuitry (IVC2) and further comprising a first interface voltage control circuitry (IVC1) electrically coupled to the body of the slider and adapted to assure substantially zero electrical potential between the slider body and the disk.

3. The disk drive of claim 2 wherein the slider further comprises a coil coupled to the write head, a read head, a heater and an embedded contact sensor (ECS), and wherein the IVC1 is electrically coupled to one of said coil, read head, heater and ECS.

4. The disk drive of claim 3 wherein the IVC1 is electrically coupled to the ECS and is further adapted to apply a common mode voltage to the ECS.

5. A heat-assisted magnetic recording (HAMR) disk drive comprising:
    a rotatable magnetic recording disk;
    a gas-bearing slider maintained over the surface of the disk when the disk is rotating;
    a write head on the slider comprising a main pole, a return pole and an electrical coil for generating a write current;
    an optical waveguide on the slider for receipt of laser radiation;
    a near-field transducer (NFT) on the slider for optical coupling with the waveguide;
    a NFT temperature sensor (NTS) on the slider and coupled to the NFT;
    a read head on the slider;
    a first interface voltage control circuitry (IVC1) electrically coupled to one of said coil and read head, the IVC1 being adapted to provide substantially zero electrical potential between the slider and the disk; and
    second interface voltage control circuitry (IVC2) coupled to the NTS and adapted to provide a negative electrical potential at the NTS relative to the disk.

6. The disk drive of claim 5 wherein the IVC2 is further adapted to apply a common mode voltage to the NTS.

7. The disk drive of claim 6 wherein the IVC2 comprises a source for generating a reference current through a pair of resistors having substantially equal resistance values, and wherein the IVC2 is further adapted to apply said common mode voltage between the two resistors of said pair.

8. The disk drive of claim 5 wherein each of the IVC1 and IVC2 is further adapted to provide a programmable voltage.

9. The disk drive of claim 5 further comprising a heater on the slider and an embedded contact sensor (ECS) on the slider, and wherein the IVC1 is electrically coupled to the ECS.

10. The disk drive of claim 9 wherein the IVC1 is adapted to apply a common mode voltage to the ECS.

11. The disk drive of claim 1 wherein the interface voltage control circuitry is further adapted to provide a negative electrical potential at the NTS relative to the disk.

12. The disk drive of claim 2 further comprising a NFT temperature sensor (NTS) coupled to the NFT.

13. The disk drive of claim 12 wherein the interface voltage control circuitry is further adapted to provide a negative electrical potential at the NTS relative to the disk.

14. The disk drive of claim 12 wherein the interface voltage control circuitry is further adapted to apply a common mode voltage to the NTS.

\* \* \* \* \*